Patented Apr. 13, 1954

2,675,316

UNITED STATES PATENT OFFICE 2,675,316

PHOTOGRAPHIC ELEMENTS CONTAINING MORDANTS

Burt H. Carroll and William O. Kenyon, Rochester, N. Y., assignors to Eastman Kodak Company, Rochester, N. Y., a corporation of New Jersey No Drawing. Application April 14, 1949, Serial No. 87,578

11 Claims. (Cl. 95—8)

This invention relates to improvements in photographic layers and more particularly to improvements in mordant compositions adapted to fix soluble dyes therein.

Many photographic color processes involve the use of a soluble acid dye in a photographic layer. The dye may serve as a light filter or may be used as a light-absorbing backing for the film to prevent reflection of light back into the emulsion. Soluble dyes of this type are commonly used in relief imbibition printing where the dye is transferred from a tanned gelatin relief to a gelatin coated paper. In each of these processes, it is essential that the dye be fixed against diffusion to prevent its bleeding out of the area to which it was originally confined. In order to accomplish this, fixing agents or mordants have been used.

We have found that the effectiveness of basic mordant compositions in preventing dye diffusion is dependent upon three factors. The first factor is degree of ionization. Since simple salt formation is believed to be the basis of this type of mordant action, the mordant must be well ionized at the particular pH existing at the point of fixation. A high degree of ionization will lessen the quantity of mordant required to fix a given amount of dye. Secondly, the mordant must possess sufficiently large molecular dimensions so that the mordant-dye salt formed will not diffuse through the colloid. The third factor is one of solubility. The mordant must be water-dispersible and compatible with the gelatin, or other colloid used.

According to our invention, these requirements for an improved mordant composition may be fulfilled by the use of an addition type polymer containing periodically occurring amino groups, such as tertiary amino groups.

These polymers are alkyl amines of the following structure:

where R is a polymeric structure, and $R_1$ and $R_2$ are the same or different alkyl or alicyclic groups, or where $R_1$ and $R_2$ together represent the atoms necessary to complete a saturated heterocyclic ring.

These mordants are believed to immobilize the dye molecule through the formation of a salt linkage with the dye, so that the dye molecule can no longer wander through the gelatin or other photographic layer employed. This differs from mordants which presumably form a molecular combination with chelate groups in the dye. The polymeric structure of our compounds provides a high molecular weight while the presence of periodically-occurring amino groups results in a moderate equivalent weight. The amino groups may be quaternized to increase ionization and solubility. Included in our invention are all homopolymers, copolymers, or derived polymers having an alkyl amine substituent of the structure stated above and the quaternized form of such substances. Where we refer to polymers it is to be understood that all such substances are included.

The quaternary compounds are water-soluble, but some of the unquaternized polymers are not water-soluble, and must be introduced to the gelatin in the form of their salts, e. g., the acetate, which are water-soluble. Where the claims refer to the unquaternized compounds, it is to be understood that this includes their simple salts, where the compounds themselves are not water-soluble.

Examples of compounds useful for the purposes of our invention are as follows:

1. Esters or amides prepared by reacting addition polymers containing carboxyl groups with a basic dialkylamino compound.

(a) N-dialkyl amine ethyl esters of polymers or copolymers containing carboxyl groups. These polymeric substances may be produced by reacting resins having combined acrylic, methacrylic, or maleic anhydride units with dialkylaminoethyl alcohol or by polymerizing the monomeric ester, e. g., β-diethylaminoethyl methacrylate. The N-dimethylaminoethyl alcohol, N-diethylaminoethyl alcohol and their homologues may be employed. The preparation of the monomeric esters is described in Graves U. S. Patent 2,138,763, granted November 29, 1938.

*Example 1.—Preparation of polydiethylamino ethyl methacrylate*

Eighty grams of the monomeric β-diethylamino ethyl methacrylate were sealed into a Pyrex glass tube and irradiated for eight days at a distance of 12 inches by light from a 250-volt Cooper-Hewitt mercury quartz arc, operating at 4 amperes. A very light yellow, viscous, clear dope was obtained. This was poured into 3 liters of 1:1 methanol and water to precipitate the polymer, which was then extracted with fresh portions of 1:1 methanol and water. It was dried in a Majonnier oven at 50° C. under a vacuum of 28 inches of mercury. The yield was 26 grams.

For quaternization, see Example 12 of Minsk and Kenyon patent application Serial No. 719,626, filed December 31, 1946 now U. S. Patent 2,484,420, granted October 11, 1949.

*Example 2*

A reaction product of β-dimethylaminoethyl alcohol and polymethacrylic anhydride was prepared as follows:

One hundred grams of methacrylic anhydride, 300 mgs. benzoyl peroxide, and 400 cc. dry dioxane were heated under steam bath reflux. After 15 minutes, the polymethacrylic anhydride had set to a white solid mass. After two hours, 200 grams of redistilled β-diethylaminoethyl alcohol were added and the heating continued for 16 hours. The resulting dope was precipitated in rapidly stirred acetone. It was washed in fresh acetone and then dried. A yield of 115 grams was obtained.

A quaternary salt was prepared by heating 2.71 grams of the β-diethylaminoethyl polymethacrylate ester on the steam bath for 6½ hours with 2.52 grams of methyl sulfate. The mixture bubbled up to several times its volume and remained sticky and glossy. It was cooled and stirred with several fresh portions of acetone to remove excess methyl sulfate, then air dried.

(b) Polymers or copolymers prepared as in (a) by reacting the resin with an amine of the type:

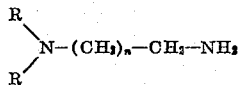

wherein

R is $CH_3$, $CH_3(CH_2)_n$ . . .
n=1, 2, 3 . . .

*Example 3.—Preparation of polyacrylyl amide of 5-diethylamino-2-amino pentane*

Forty grams of 5-diethylamino-2-amino pentane were dissolved in 200 cc. of dry acetone in a glass outfit equipped with a stirrer, a dropping funnel and a reflux condenser protected by a calcium chloride tube. The reaction mixture was chilled in an ice bath. To this was added dropwise, with stirring, 200 grams of a 10 per cent solution by weight of polyacrylyl chloride in dry acetone. The product precipitated as a mass during the addition of the acid chloride. After all the acid chloride had been added, the reaction mixture was stirred for 1.5 hours at room temperature, and then for one hour at reflux. The acetone was then decanted and the solid product extracted repeatedly with fresh portions of acetone with mechanical stirring. The product was dried in a vacuum desiccator under constant water pump vacuum. The yield was 39 grams. Nitrogen and chlorine were 10.2 and 12.8 per cent respectively. The calculated values were 11.2 and 14.2.

*Quaternization.*—Ten grams of the above polymer were dispersed on a shaker in 100 cc. of methyl Cellosolve. To this was added 20 cc. of a 4 per cent solution by weight of sodium in ethyl alcohol. The dope was filtered to remove the precipitated sodium chloride. Fifteen cc. of methyl p-toluene sulfonate was then added and the reaction mixture heated on a steam bath in an all-glass reflux outfit protected by calcium chloride for 18 hours. The clear, smooth dope obtained was then filtered through paper by suction and poured into 1.5 liters of ethyl ether with stirring. The product precipitated as a light yellow, friable precipitate which was then extracted thoroughly with fresh portions of ether. It was dried in a vacuum desiccator under constant water pump vacuum. The yield was 14.5 grams.

The resins described above contain the basic unit:

1(a)

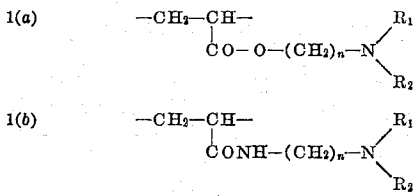

1(b)

where $R_1$ and $R_2$ are $CH_3$, $CH_3(CH_2)_n$ and n= 1, 2, 3, etc.

2. Polymers or copolymers of compounds having a combined N-vinyl dialkylamine group and containing the basic unit

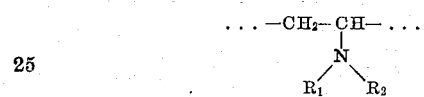

where $R_1$ and $R_2$ are $CH_3$, $CH_3(CH_2)_n$ . . ., or alicyclic groups, e. g., cyclohexyl, or together represent the atoms necessary to complete a saturated heterocyclic ring, e. g., piperidine or morpholine, and n=1, 2, 3 . . .

*Example 4*

A reaction product of diethylamine and a vinyl benzene sulfonate-vinyl alcohol copolymer was prepared as follows:

Forty grams of polyvinyl benzene sulfonate was mixed with 300 cc. of anhydrous dioxane, 20 cc. of water, and 100 grams of anhydrous diethylamine in a sealed flask. The flask was shaken to effect solution and was placed in a bath at 60° C. for 7 days. The resulting viscous solution was filtered, concentrated to a suitable volume and precipitated in water. The resulting resin was leached and dried, and found to be insoluble in water but soluble in dilute acid. Its structure is believed to be as follows:

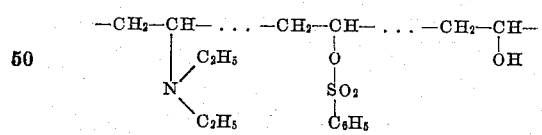

*Example 5*

A reaction product of piperidine and a vinyl benzene sulfonate-vinyl alcohol copolymer was prepared as follows:

Thirty grams of polyvinyl benzene sulfonate was dried thoroughly over $P_2O_5$ in vacuum at room temperature. Anhydrous piperidine (150 cc.) was added to this resin in a flask, the flask evacuated, and nitrogen added. The reaction mixture was kept at 50° C. for six days, after which the product was filtered and precipitated in water. A yellow resinous product was separated and leached with water. It was dried, dissolved in ether, filtered, poured into water, leached and dried. It is believed to contain the following basic unit:

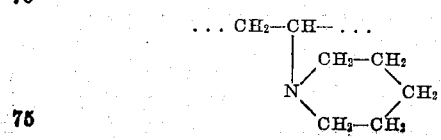

Example 6

A reaction product of morpholine and a vinyl benzene sulfonate-vinyl alcohol copolymer was prepared as follows:

Ten grams of polyvinyl benzene sulfonate was dried in vacuum over $P_2O_5$ at room temperature. Anhydrous morpholine (75 cc.) was added and the reaction mixture was placed in a bath at 50° C. for 7 days. The reaction mixture was then filtered and precipitated in water. The resulting resin was washed and dried. It is believed to contain the following basic unit:

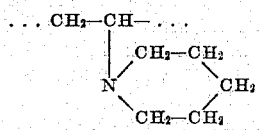

Example 7

A reaction product of dicyclohexylamine and a polyvinyl methane sulfonate was prepared as follows:

Ten grams of polyvinyl methane sulfonate was mixed with 100 cc. of dioxane, 100 g. of dicyclohexylamine, and 5 cc. of water. This mixture was heated on a steam bath for 72 hours, and then poured into water. A light yellow resin separated. This resin was washed in water and dried. It was soluble in dilute acid, and could be reprecipitated by adding alkali to the acid solution.

It is believed to contain the following basic unit:

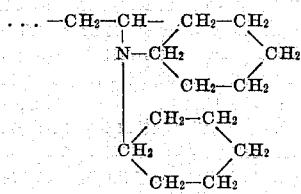

3. Polymers or copolymers of compounds having a combined dialkylamine acrylic group, and containing the basic unit

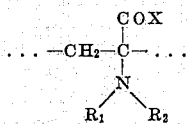

where $R_1$ and $R_2$ are $CH_3$, $CH_3(CH_2)_n$ . . .

$n = 1, 2, 3$ . . .

and

X is OH, $NH_2$, alkoxy, or alkyl

4. Polymers or copolymers of compounds containing a vinyl ester group in which the acyl group is derived from an N-dialkylamino acid, and containing the basic unit

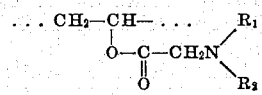

where $R_1$ and $R_2$ are $CH_3$, $CH_3(CH_2)_n$ . . .

and $n = 1, 2, 3$ . . .

5. Polyvinyl acetals derived from an alcohol containing a dialkylamino group. These compounds may be prepared according to the method disclosed in Swan U. S. Patent 2,358,836, granted September 26, 1944.

The above types of compounds may be used as the tertiary amines or may be converted into corresponding quaternary ammonium compounds to increase their effectiveness. Quaternary ammonium compounds are strongly ionized at any value of pH. However, ternary nitrogen compounds are strong enough bases so that there is considerable ionization at a pH of the order of 3 to 4, which is commonly used in the relief imbibition process for transfer of dyes from gelatin matrices. Quaternization may be carried out by reacting the tertiary compound, before or after polymerization, with an ester, such as methyl p-toluenesulfonate. Alkyl sulfates, alkyl halides or other esters may be used.

By "copolymer" we mean to include those resins formed by interpolymerization of a nitrogenous and a non-nitrogenous monomer, as well as those derived from two or more nitrogenous monomers, or by a reaction resulting in the formation of a tertiary amino group in a previously-formed polymer.

Our invention may be carried out in accordance with the examples set forth below:

Example 8

A film was coated with a mixture of 40 grams of gelatin and 2 grams of the product of Example 2 at pH 4.5. This film was used for transfer of an acid dye, Alizarin Saphirol B, C. I. 1054 from a matrix of hardened gelatin. The compound acted as a mordant, improving the definition of the image over that of a corresponding image transferred to a film coated with gelatin hardened with chrome alum.

Example 9

Poly-β-diethylaminoethyl methacrylate acetate (A) and its quaternary salt (B) were separately mixed with the dye [(3-ethyl-2(3)-benzoxazylidene)ethylidene] - 1 - p - sulfophenyl-3-methyl-5-pyrazolone in the proportions indicated in the following table and were coated on glass plates. No bleeding of dye was indicated when the coatings were immersed in distilled water. The coatings were overcoated with a fast unsensitized gelatino silver halide emulsion and tested photographically by exposing and developing the photographic layer. The results shown in the following table indicate that diffusion of the dye into the emulsion was stopped both by the poly-β-diethylamino ethyl methacrylate and its quaternary salt since there was no loss of speed corresponding to that in the undercoat of gelatin containing the dye only.

| Undercoat | Speed | γ |
|---|---|---|
| Plain gelatin | 630 | 1.38 |
| 0.14 g. dye in 100 cc. 5% gelatin | 330 | 0.61 |
| 0.14 g. dye + 0.17 g. (A) in 100 cc. 5% gelatin | 955 | 0.84 |
| 0.14 g. dye + 0.35 g. (B) in 100 cc. 5% gelatin | 590 | 1.07 |

It is apparent that modifications and variations of our invention may be made without departing from the spirit thereof. Any polymer of the addition type, containing periodically-occurring carboxyl groups, may be used to form an ester or amide with any basic dialkylamino compound capable of such ester or amide formation. In addition, the nitrogenous polymers of our invention include all those prepared by polymerizing a vinyl or substituted vinyl compound containing a dialkylamino group. By substituted vinyl group, we mean to include polymers prepared from the compounds of the α-dialkylamino acrylate type, wherein the alpha carbon atom contains two different substituents, one of which is a dialkylamine group, and the other is a substituent other than hydrogen. These polymers may be homopolymers or they may be copolymers. The dialkylamino compound may be a tertiary amine or it may be quaternized depending upon conditions of use.

What we now claim and desire to secure by U. S. Letters Patent is:

1. A photographic element comprising a support having thereon at least two gelatin layers, at least one of said gelatin layers being a silver halide emulsion layer and at least one of said gelatin layers having distributed therein a substantially water-insoluble salt of a water-soluble acid dye with a polymeric mordant comprising a linear polymer of a monoethylenically unsaturated polymerizable compound having periodically occurring dialkylamino groups attached thereto.

2. A photographic element comprising a support having thereon at least two gelatin layers, at least one of said gelatin layers being a silver halide emulsion layer and at least one of said gelatin layers having distributed therein a substantially water-insoluble salt of a water-soluble acid dye with a polyvinyl polymer having recurring

groups attached to said polymer, where $R_1$ and $R_2$ are selected from the group consisting of alkyl groups, alicyclic groups and structures in which $R_1$ is $-CH_2X$ and $R_2$ is $-CH_2Y$, X and Y together representing the atoms necessary to complete a saturated heterocyclic ring.

3. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being a poly $\beta$-N-dialkyl amino carboxylic acid vinyl ester.

4. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being a quaternary ammonium salt of a poly $\beta$-N-dialkyl amino carboxylic acid vinyl ester.

5. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being a poly dialkylamino carboxylic acid vinyl amide.

6. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being a $\beta$-diethylaminoethyl-methacrylate polymer.

7. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being polymeric $\beta$-diethylaminoethyl-methacrylate metho-methylsulfate.

8. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being an N-vinyl dialkylamine polymer.

9. A light-sensitive photographic element comprising a support having thereon at least two gelatin layers, at least one of said gelatin layers being a silver halide emulsion layer, and at least one of said gelatin layers having distributed therein a polymeric mordant adapted to fix a soluble acid dye in said gelatin, said mordant being a reaction product of diethylamine and a vinyl benzene sulfonate-vinyl alcohol copolymer.

10. A photographic element comprising a support having thereon at least two gelatin layers, at least one of said gelatin layers being a silver halide emulsion layer and at least one of said gelatin layers having distributed therein a substantially water-insoluble salt of a water-soluble acid dye with a polymeric mordant comprising a $\beta$-diethylaminoethyl-methacrylate polymer.

11. A photographic element comprising a support having thereon at least two gelatin layers, at least one of said gelatin layers being a silver halide emulsion layer and at least one of said gelatin layers having distributed therein a substantially water-insoluble salt of a water-soluble acid dye with a polymeric mordant comprising polymeric $\beta$ - diethylaminoethyl - methacrylate metho-methylsulfate.

References Cited in the file of this patent

UNITED STATES PATENTS

| Number | Name | Date |
| --- | --- | --- |
| 2,168,336 | Heckert | Aug. 8, 1939 |
| 2,191,887 | Heckert | Feb. 27, 1940 |
| 2,276,322 | Lowe | Mar. 17, 1942 |
| 2,328,900 | Grim | Sept. 17, 1943 |
| 2,317,184 | Dreyfuss | Apr. 20, 1943 |
| 2,358,836 | Swan | Sept. 26, 1944 |
| 2,484,430 | Sprague | Oct. 11, 1949 |
| 2,522,042 | Kaszuba | Sept. 12, 1950 |